United States Patent
Melen

[19]
[11] Patent Number: 5,949,554
[45] Date of Patent: Sep. 7, 1999

[54] HIERARCHICAL SYSTEM FOR PROCESSING AND DISPATCHING TASK ORDERS INTO A USER NETWORK AND METHOD

[75] Inventor: Roger D. Melen, Los Altos Hills, Calif.

[73] Assignee: Canon Kabushiki Kaisha, Tokyo, Japan

[21] Appl. No.: 08/986,758

[22] Filed: Dec. 8, 1997

[51] Int. Cl.[6] .............................. H04N 1/40; H04N 1/32; H04N 1/00

[52] U.S. Cl. ...................... 358/448; 358/443; 358/468; 358/403

[58] Field of Search .................................. 382/180, 209, 382/217, 215, 224, 226, 305; 358/443, 403, 468, 470, 448, 434, 435, 436

[56] References Cited

U.S. PATENT DOCUMENTS

| | | | |
|---|---|---|---|
| 4,106,060 | 8/1978 | Chapman | 358/256 |
| 4,686,704 | 8/1987 | Kamada | 382/61 |
| 4,748,317 | 5/1988 | Satoh | 235/462 |
| 4,811,111 | 3/1989 | Kurokawa | 358/257 |
| 4,970,554 | 11/1990 | Rourke | 355/220 |
| 5,124,748 | 6/1992 | Tanabe et al. | 355/200 |
| 5,153,746 | 10/1992 | Satoh | 358/401 |
| 5,255,104 | 10/1993 | Kajigaya | 358/403 |
| 5,325,212 | 6/1994 | Endo | 358/468 |
| 5,719,960 | 2/1998 | Melen | 382/209 |

*Primary Examiner*—Jerome Grant, II
*Attorney, Agent, or Firm*—Paul Hentzel

[57] ABSTRACT

Task order system 10 processes task orders through processing conditions, and dispatches the task orders concerning user record documents throughout user network 10N. Task order 10T is carried on an input medium suitable for scanning such as ordinary paper, and specifies both the dispatch task and the record document The task order contains process codes 10P and dispatch images 10D. Scanner 10S receives the input medium and scans the task order thereon to obtain pixel images of the process codes and dispatch images. Process code detector 12D detects the process codes which initiate the processing of the task order. Dispatch decoder 14D receives the pixel images from the scanner for decoding the dispatch images to provide dispatch codes. Dispatcher 16D is responsive to the dispatch codes for dispatching the task order throughout the user network.

29 Claims, 5 Drawing Sheets

Providing a Task Order

Scanning the Task Order
    to Provide a Pixel Data Stream

Storing the Pixel Data Stream

Detecting Primary Process Codes
    in the Pixel Data Stream Storing the Detected
    Primary Process Codes Decoding the Pixel Images
    in the Stored Pixel Data Stream     Assigning Priorities
        to the Task Orders     Providing Priority Que     Directing Decoder to Entry Zones Dispatching Task Orders Providing Record Document Memory

Fig 5

HIERARCHICAL SYSTEM FOR PROCESSING AND DISPATCHING TASK ORDERS INTO A USER NETWORK AND METHOD

TECHNICAL FIELD

This invention relates to dispatching record document task orders throughout a user network, and more particularly to such task orders that are scanned and processed by hierarchical codes through a corresponding hierarchy of decoders.

BACKGROUND

Heretofore tasks concerning record documents were dispatched by processing instructions hand entered directly into a terminal keyboard by the user. The user entered the task to be distributed, which was typically retrieving and filing record documents. The user also entered document numbers and file names required to identify the record document. The task instruction and related numbers had to entered each time that task was executed. US patent p,ppp,ppp issued on ii/ii/ii to the present inventor (currently application Ser. No. 08/670,955 filed on Jun. 26, 1996 Applicant's Docket Number FEN 2471 US, assigned to the present assignee) discloses a task order system which dispatched task orders based on task identification (ID) symbols and record document index symbols contained in the task order. The task order was scanned to obtain pixel images of the symbols which were classified by the system to provide task ID codes and index codes. The codes included information which initiated and executed the dispatching with minimal keyboard activity by the user. However, the time required to classify (decode) the task ID symbols slowed down the operation of this prior task order system.

SUMMARY

It is therefore an object of this invention to provide an improved hierarchical system and method for dispatching task orders throughout a user network.

It is another object of this invention to provide task orders containing primary process codes for initiating the task order processing without requiring classification or decoding.

It is a further object of this invention to provide such a system and method to provide in which the primary process codes are detected while the task orders are being scanned.

It is a further object of this invention to provide task orders containing secondary dispatch images which are decoded with the assistance of processing information from the primary process codes.

It is a further object of this invention to provide a plurality of decoders for decoding a plurality of code formats.

It is a further object of this invention to provide primary process codes which designate the location of the secondary dispatch images within the task order.

It is a further object of this invention to provide primary process codes which designate the priority of the task orders waiting for decoding.

Briefly, these and other objects of the present invention are accomplished by providing a hierarchical system which processes and dispatchs the task orders throughout a user network. The system executes various kinds of dispatch tasks which affect record documents throughout the network. Task orders carried on an input medium suitable for scanning, are associated with the user record documents. The task orders have sequential hierarchical processing conditions within the system including, a pre-decoding primary condition, a decoding condition, and a post-decoding dispatch condition. Each task order contains primary process codes which facilitate the processing of the task orders during the pre-decoding primary condition. Each task order also contains secondary dispatch images which facilitate the processing of the task orders during the post-decoding dispatch condition after the dispatch images on the task order have been decoded. A scanner scans the task order during the pre-decoding primary condition to provide a pixel data stream incorporating pixel images of the primary process codes and the dispatch images contained in the task order. A primary code detector monitors the pixel data stream from the scanner during the predecoding primary condition, and detects the primary process codes therein based on the pixel images. A primary code memory stores the detected primary process codes and holds the detected primary process codes available to the system during the processing of the task orders. A task order memory receives the pixel data stream from the scanner, and stores the pixel images of the dispatch images on the task orders during the decoding condition. Secondary decoders decode the pixel images of the dispatch images contained in each task order stored in the task order memory during the decoding condition to obtain dispatch image codes. A dispatcher responsive to either the primary process codes or the dispatch image codes or both for dispatching the task orders associated with the record documents during the post-decoding dispatch condition for executing the various kinds of dispatch tasks.

BRIEF DESCRIPTION OF THE DRAWING

Further objects and advantages of the present hierarchical task order dispatching system and the operation of the primary and secondary codes will become apparent from the following detailed description and drawing (not drawn to scale) in which.

The first digit of each reference numeral in the above figures indicates the figure in which that element is most prominently shown. The second digit indicates related structural elements, and a final letter (when used) indicates a sub-portion of an element.

REFERENCE NUMERALS IN DRAWING

The table below lists all of the reference numerals employed in the figures, and identifies the element designated to by each numeral.

10 Task Order System 10
  10D Dispatch Images 10D
  10N User Network 10N
  10P Process Codes
  10R Record Document 10R 10S Scanner 10S
10T Task Order 10T
12D Process Code Detector
12M Process Code Memory
14D Dispatch Image Decoder 14D
14M Task Order Memory 14M
16 Dispatcher 16
18D Display device 18D
18K User Keys 18K
18M Record Document Memory
20T Task Order 20T
22 Process Codes 22
    22Z ID Placement Zone 22Z
    23 Auxiliary Process Codes 23
    23Z Auxiliary Placement Zone 23Z
24 Dispatch Image 24
    24Z Entry Zones 24Z
30 Task Order System 30
    30N User Network 30N
    30S Scanner 30S
    32A Additional Look-up Table 32A
    32D Bar Code Detector 32D
    32M Parameter Memory 32M
    32P Priority Look-up Table 32P
    32Q Class Que 32Q
    32Z Zone Look-up Table 32Z
    34C Classifier Decoder 34C
    34M Task Order Memory 34M
    34U Override Unit 34U
36 Dispatcher 36
40 Task Order System 40
    40M Image Memory 40M
    40N User Network 40N
    40S Scanner 40S
    40T Task Order 40T
    42D Primary Decoder 42D
    42M Primary Code Memory 42M
    44F First Secondary Decoder 44F
    45F First Secondary Code Memory 45F
    44N Nth Secondary Decoder 44N
    45N Nth Secondary Code Memory 45N
    44S Second Secondary Decoder 44S
    45S Second Secondary Code Memory 45S
46 Dispatcher 46

Figure 1:
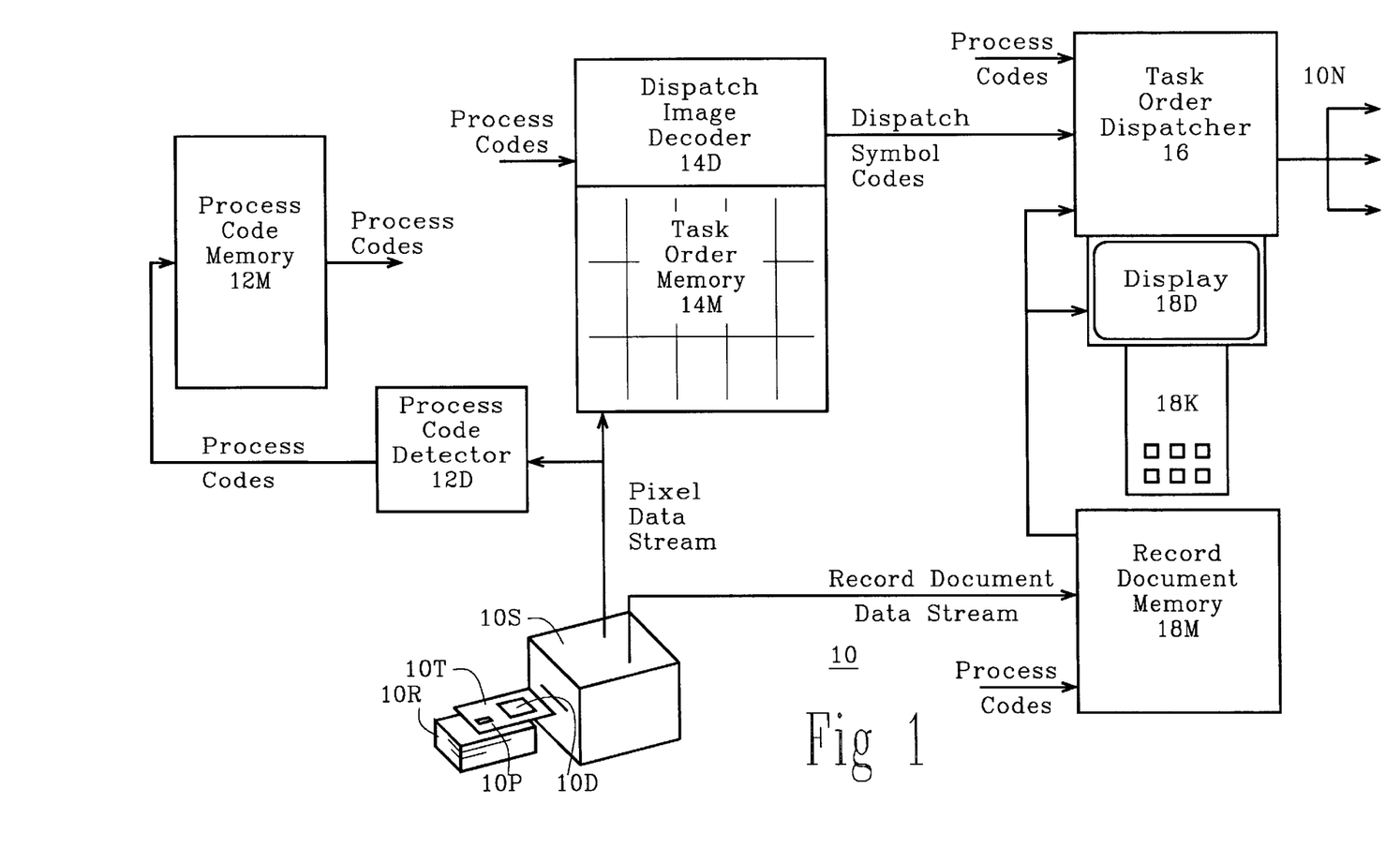
FIG. 1 is a block diagram of a hierarchical system employing process codes and dispatch codes for dispatching record document task orders.

GENERAL DISPATCH SYSTEM (FIG. 1)

Task order system 10 dispatchs task orders associated with user record documents 10R throughout a user network 10N for executing various kinds of dispatch tasks which affect the record documents. Task order 10T is carried on an input medium suitable for scanning such as ordinary paper (shown in more detail in FIG. 2). The task orders provide hierarchical operating information which supports sequential task order processing conditions within the system including,     a pre-decoding primary condition,
    a decoding condition, and
    a post-decoding dispatch condition. These processing conditions concern the status of the task orders and are not operating stages of the system. The system may simultaneously process many task orders in each condition. However, each task order must pass through the conditions sequentially, one condition at a time.

Each task order contains primary process codes 10P which initiate the processing of the task order during the pre-decoding primary condition of that task order. The primary process codes facilitate the decoding dispatch images and dispatching the task orders. Each task order also contains secondary dispatch images 10D which facilitate the processing of the task orders during the post-decoding dispatch condition of that task order after the dispatch images have been decoded. A suitable image capture device such as scanner 10S receives the input medium and scans the task order carried thereon during the pre-decoding primary condition. The scanning provides a pixel data stream incorporating pixel images of all the image information carried on the task order. This data stream includes pixel images of the process codes and the dispatch images.

Process code detector 12D monitors the pixel data stream from the scanner during the pre-decoding primary condition, and detects the primary process codes therein based on the pixel images. Process code memory 12M stores the detected primary process codes and holds the detected codes available to the system during the processing of the task orders. Task order memory 14M receives the pixel data stream from the scanner. The scanned pixel images are stored in the task order memory, from which the dispatch images of each task order are retrieved when that task order is in the decoding condition. Dispatch image decoder 14D decodes the pixel images of the dispatch images retrieved from the task order memory during the decoding condition of each task order to obtain dispatch image codes. During the dispatch condition of each task order, dispatcher 16 is responsive to either the detected process codes or the decoded dispatch image codes (or both) of that task order. The task orders associated with the record documents execute the various kinds of dispatch tasks throughout the network. System 10 dispatches task orders which may affect record documents located in remote databases.

The primary process codes are presented to the system from the task orders are in code format, and do not require decoding like the dispatch images. The code format may be any suitable digital code or bar code expressing a unique digital number or pattern. The presence of the process codes in the data stream is rapidly detected, and the processing information in these codes is immediately available to the system. Display device 18D may be any suitable viewing device, for notifying the user of the condition of each task order and the overall operating status of the system. The display may show the process codes as they are detected in the data stream, or the absence of any detectable code. The absence of a code may be caused by a flaw in the task order which renders the code non-detectable; or the task order may not have been a task order sheet at all, just a misplaced sheet of record document. The display may also show the dispatch image codes as they are presented to the dispatcher. The user may correct the codes or manually select a different code through user keys 18K.

Record document memory 18M stores pixel images of the user record documents associated with the task orders. These pixel images are typically obtained by scanning sheets of paper records. The record sheets may be locally scanned along with the task order cover sheet (as shown in FIG. 1). Alternatively, the record sheets may be scanned by a remote scanner in a remote part of the system. The record document is the fundamental unit of record data stored at a single address within the network. The record document may be an entire report or book, or a single sheet or chapter within a book, or a just cluster of facts which are accessed as a unit. The detected primary process codes may include record document identification codes for retrieving the pixel images of the record documents stored in record document memory 18M during the processing of the task orders. The user may scan a record document into the record document memory, and immediately retrieve the pixel image for confirmation on the display before the primary condition has been completed. The user may conveniently review the pixel images of the record documents for content during the extended decoding condition.

Figure 2:
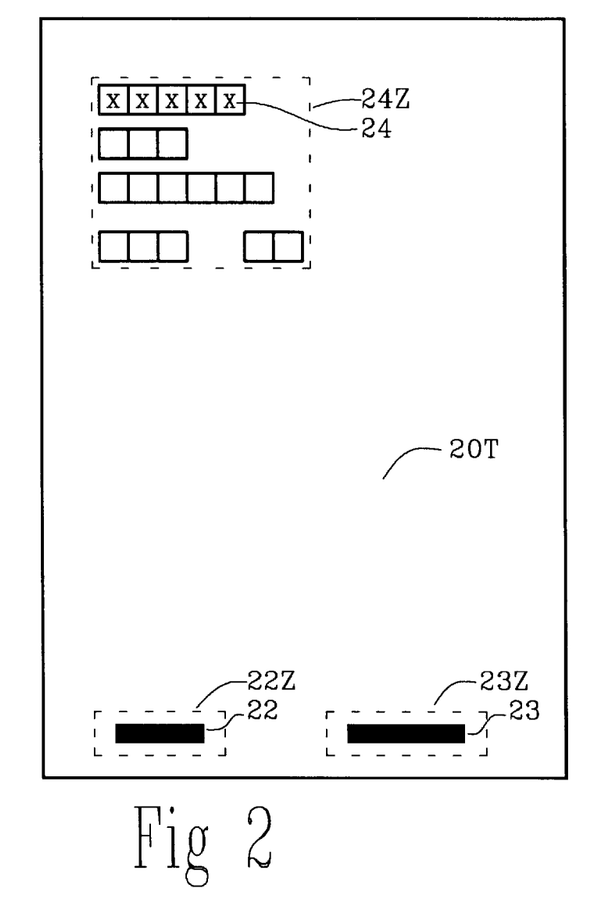
FIG. 2 is a diagram of a task order cover sheet.

TASK ORDER FORMAT (FIG. 2)

Task order 20T contains primary process codes 22 (see FIG. 2), and dispatch image 24 formed by symbols (represented by "x"s). Each process code forms a unique sequence of digits or bars associated with a particular dispatch task. The dispatch images form a unique sequence of symbols or characters associated with a particular record document.

Task order 20T may be carried on a single cover sheet separate from the record documents and specifically designed for dispatching task orders, as shown in the general embodiment of FIG. 1. The association between the record documents and the separate task order is established by the image information carried on the task order. Preferably, the dispatching information decoded from the image information identifies the record documents upon which the task is to be executed. This identification may done through a document number, a folder name or any suitable identifier carried on the task order. Alternatively, the task order may be physically included on the first page of the record document itself and is associated through physical connection with the record document.

TASK ORDER IDENTIFICATION (FIG. 2)

The detected primary process codes from each task order may contain at least one task ID code, defining a particular dispatch task of the various kinds of record document dispatch task. The dispatcher is responsive to each task ID code for dispatching task orders in accordance with the particular dispatch task defined thereby. One kind of dispatch task files record documents or updates the contents (text) of record documents. Another dispatch tasks retrieve record documents from one database and moves (or copies) the record documents to another database. Other dispatch tasks retrieve record documents for printing locally or faxing to remote locations. A common dispatch task involves locally scanning a hardcopy of the record document, and filing the pixel image (or codes) into a record document memory. A dispatch task might involve modifying the storage parameters of a record document such as reducing the image resolution of older record documents to conserve image memory. The task ID codes may form a set of "T" codes which define the tasks. The various kinds of record document dispatch tasks defined by the task ID codes may also form a corresponding set of "T" dispatch tasks, one task for each task ID code.

Placement Zones

The task ID codes may be position sensitive, having assigned locations within the task order at a predetermined task ID placement zones 22Z. The remainder of the task order is void of task ID codes, which reduces the monitoring burden on the detector. The detector is not required to continuously monitor the data stream. The data stream is monitored only during the short time period which incorporates the images within the placement zones. This limited monitor window minimizes "noise codes" and other errors which may be present in the bulk remainder of the task order. This reduced monitoring period is particularly useful in embodiments where the detection occurs slower than the scanning.

The task order may have one ID placement zone 22Z for all of the task ID codes in the set of "T" task ID codes. Alternatively, the task order may have "T" assigned positions, one position for each of the "T" task ID codes in the set of "T" task ID codes.

The primary process codes may be composite task ID codes having a basic task ID code 22 and at least one auxiliary task ID code 23. The basic code is located within the task order at predetermined basic placement zone 22Z as described above. The auxiliary code is located within the task order in an auxiliary placement zone 23Z at a predetermined position relative to the basic zone. Once the basic code is detected, the locations of the auxiliary codes may be determined.

Alternatively the task ID codes and other process codes may be position insensitive, and not positioned within the task order at a predetermined location. In this case the detector must monitor the data stream continuously because the task ID codes could be anywhere within the pixel image. The position insensitive embodiment is particularly suitable for use with bar code type process code, because the detection may occurs as fast as the task order scanning. This fast bar code detector monitors the data stream continuously without introducing a delay or extending the time of the primary condition.

Figure 3:
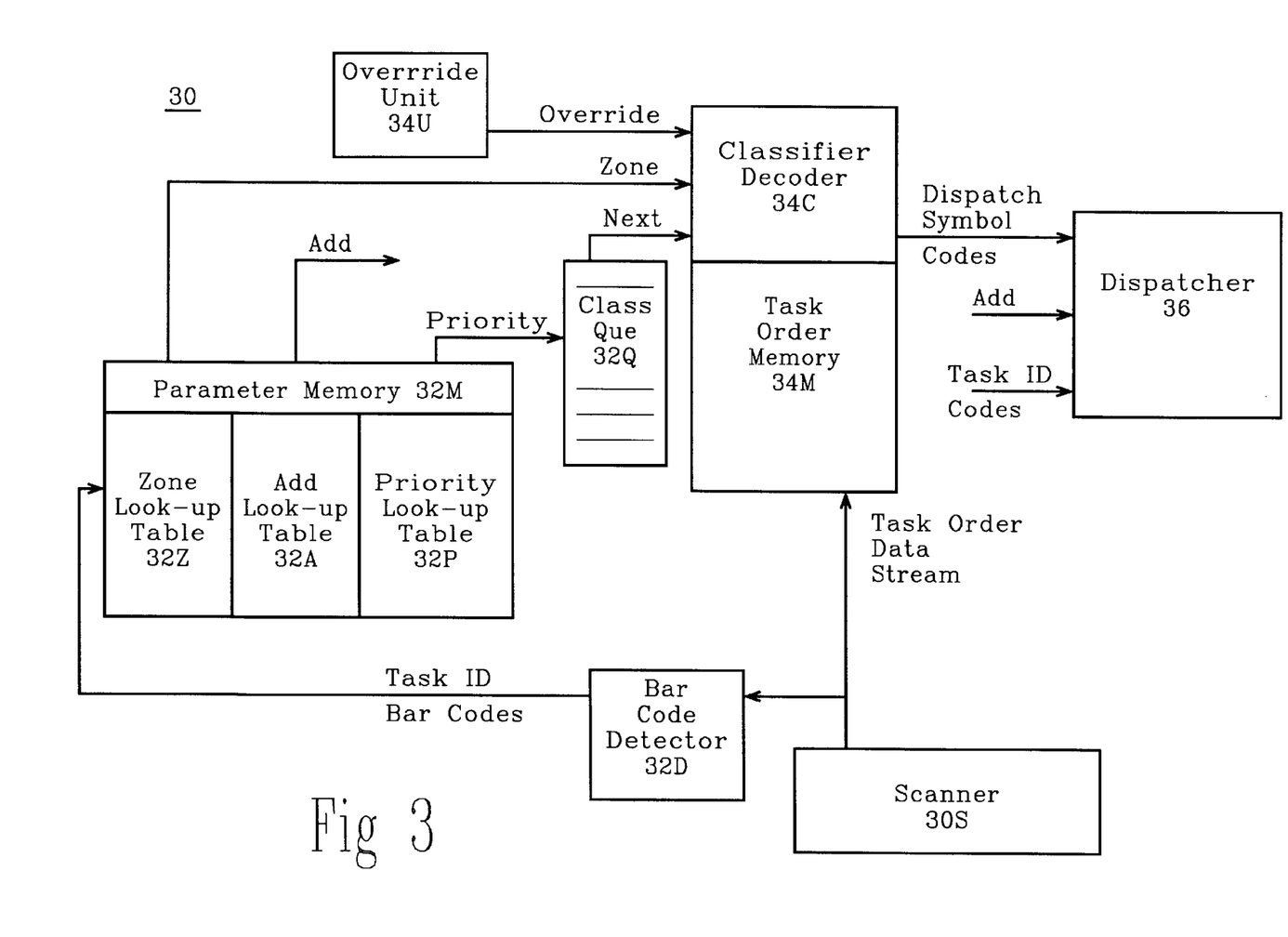
FIG. 3 is a block diagram of a hierarchical system showing a parameter memory which stores process parameters defined by task ID bar codes.

PROCESS PARAMETER EMBODIMENT (FIG. 3)

The task ID codes from the task orders may define process parameters for each kind of dispatch task. The process parameters facilitate processing the task orders during the processing conditions within task order system 30. The process parameters may be stored as codes in any suitable storage device such as parameter memory with look-up tables 32Z, 32A, and 32P. The process parameter codes defined by each task ID code are selected by that task ID code in the data stream. The selected process parameters are then held available in the parameter memory during the processing conditions. The process parameters have more storage capacity then the process codes. The process parameters hold more processing information and can therefore extend the scope of the task order processing conditions. The parameter memory may be part of an external system memory such as a database memory of hard drive. Alternatively, the process parameters may be embedded directly as process codes in the data stream. These embedded process parameters are detected during the primary condition along with other primary process codes.

Entry Zone Codes

One of the process parameters may define entry zones 24Z containing the dispatch images. Some (or all) of dispatch images may be located in dispatch image entry zones having predetermined positions within the task orders. The process parameter codes include zone codes stored in lookup table 32Z which designate the locations of the predetermined positions. The zone codes facilitate the decoding of dispatch images by directing the decoder to the dispatch image entry zones within the task orders The decoder is prevented from decoding images outside the dispatch image entry zones, thus minimizing the decoding requirements of the system. The entry zone may be located in any suitable position within the task order. In the embodiment of FIG. 2, entry zone 24Z is located in the upper lefthand region of sheet 20T where heading material customarily appears in memos and reports. The dispatch images located in the entry zones may be images of human readable symbols hand entered into entry fields within the entry zones. The entry zones assist the user in entering the symbols at the correct location. Override unit 34U may include a zone override feature which suppresses the zone codes, permitting the decoder to decode images outside the dispatch image entry zones. The user may manually override the decoder, and elect to decode all of the images contained in the entire task order.

Priority Codes

Other process parameters may define decoding priorities for the dispatch images. The process parameter codes may include priority codes stored in look-up table 32P which designate the relative priority of each kind of dispatch task for assigning a priority to each task order waiting for decoding. Priorities facilitate the decoding of the dispatch images by directing the decoder to the highest priority. There may be a set of "T" priorities, one for dispatch task in the set of "T" kinds dispatch tasks. Alternatively, some kinds of tasks may have equal priority or no priority. Task identification and task priority from the process parameters become available early in the task order processing, prior to the decoding of the dispatch images. Decode Que 32Q tracks the task orders stored in the task order memory waiting for decoding, and responds to the priority codes for presenting the task orders to the decoder in order of priority. Override unit 34U may include a priority override feature which suppresses the priority codes, permitting the decoder to decode the task orders as directed by the priority override. The user may override the decoder, and manually elect the order in which the task orders are to be decoded. The manual priority may be higher or lower than the code priority, may include an interrupt now priority, or may be a systematic priority such first-in-first-out (FIFO) or last-in-first-out (LIFO). The process parameters may define additional features which supplement the above entry zone and priority features. The codes for these additional feature are stored in look-up table 32A.

Dispatch Image Parameters

The dispatch image codes from each task order define dispatch parameters which facilitate dispatching the task orders during the post-decoding condition. The dispatch images are not available to function as dispatch codes until after the decoding condition. In the embodiment shown in FIG. 3, the primary process codes are bar codes detected by bar code detector 32D, and the dispatch images are human readable classifiable symbols. Task order memory 34M receives pixel images of the dispatch symbols from scanner 30S for presentation to classification decoder 34C. The classification is accomplished by OCR techniques to provide dispatch symbol codes such as ASCII codes or unacodes (pictograms). The classifying software may be "robust" and capable of classifying a wide range of character fonts. However a single known font which is highly OCR compatible is preferred for the classifiable symbols. The dispatch symbols are preferable typed on preprinted task order sheets. However, the symbols may be formed by an ink stamped legend or even hand written by the user. A constrainment grid for guiding hand entered symbols is described in U.S. patent application entitled METHOD OF NETWORK DISTRIBUTION OF RECORD DATA USING TRANSMITTAL SYMBOLS HAND ENTERED ON A TRANSMITTAL SHEET by Inventors Roger D Melen and Radovan V. Krtolica, U.S. Ser. No. 08/567,763, filed Dec. 5, 1995, and assigned to the present assignee. Dispatcher 36 is responsive to the task ID codes and the dispatch symbol codes and the additional codes for dispatching the task orders throughout network 30N.

Figure 4:
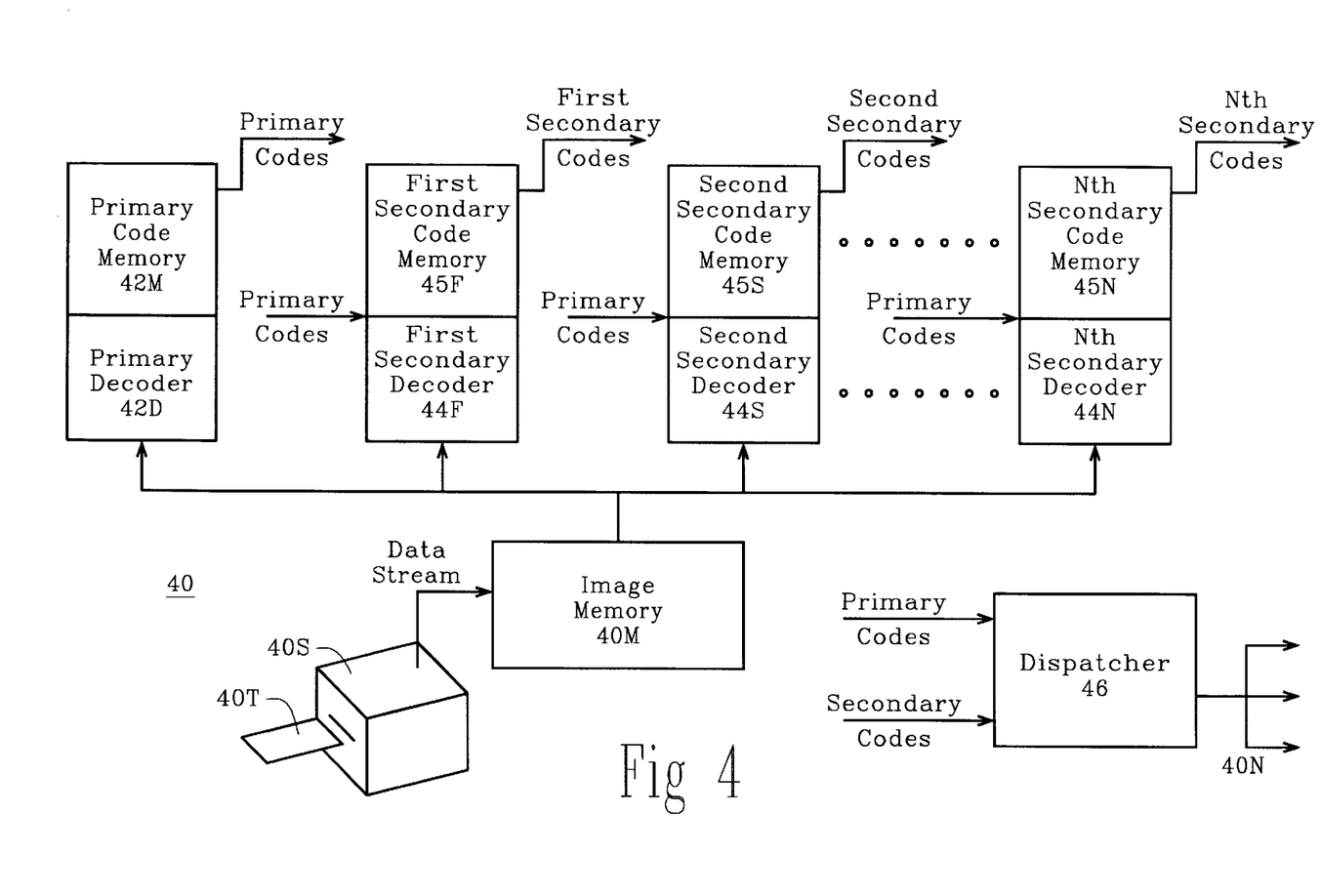
FIG. 4 is a block diagram of a general system showing the hierarchical nature of primary and secondary codes.

GENERAL HIERARCHICAL SYSTEM (FIG. 4)

The hierarchical nature of the codes and decoders in task order system 40 is illustrated in FIG. 4. The task orders contain images of primary process codes which define independent primary information, and dispatch images of secondary codes which define dependent secondary information. The images of the primary codes are decoded by primary decoder 42D and stored in primary code memory 42M independently of the secondary codes. The primary codes initiate the processing of the task orders. The dispatch images of the secondary codes are decoded by a plurality of secondary decoders forming a series of "N" decoders (first secondary decoders 44F, second secondary decoders 44S . . . Nth secondary decoders 44N). The decoded secondary codes are stored in a plurality of secondary code memories forming a corresponding series of memories (first secondary code memory 45F and second secondary code memory 45S . . . Nth secondary code memory 45N). The secondary code memories hold the secondary codes available to task order system 40 during the dispatching of the task orders. The images of the secondary codes are dependent for decoding on the primary codes, and are operative during the secondary dispatch condition of the task order.

In operation, the task orders have a pre-decoding primary condition, a decoding condition, and a postdecoding secondary dispatch condition. Task orders 40T are scanned by scanner 40S and the resulting pixel images are temporarily stored in image memory 40M. An image data stream of the task order images is provided by image memory 40M to primary decoder 42D and to secondary decoders 44F, 44S . . . 44N. Primary codes incorporated in the data stream are decoded by primary decoder 42D for storage in primary code memory 42M. These decoded primary codes are applied to the secondary decoders and the secondary code memories and dispatcher 46 to operate the hierarchical system during the processing conditions. Dispatch images incorporated in the data stream are decoded by the secondary decoders for storage in the secondary code memories. These decoded secondary codes are also applied to dispatcher 46 during the dispatch condition to facilitate dispatching task orders throughout network 40N.

Multiple Code Formats

In a multiple code format embodiment, the task orders may contain multiple code image formats (black and white, color, toner intensity) with multiple code structure formats (digital, bar code, symbols). In the multiple format embodiment shown in FIG. 4, the dispatch images have N types of code formats where N is an integer having a value of 1 or greater. Each task order may contain up to N types of the code formats. The N secondary decoders decodes the N formats. In a dedicated embodiment, each of the N secondary decoders is dedicated to decoding one of the N formats. Particular entry zones may likewise be dedicated to a particular format, to facilitate the decoding by each dedicated decoder.

Figure 5:
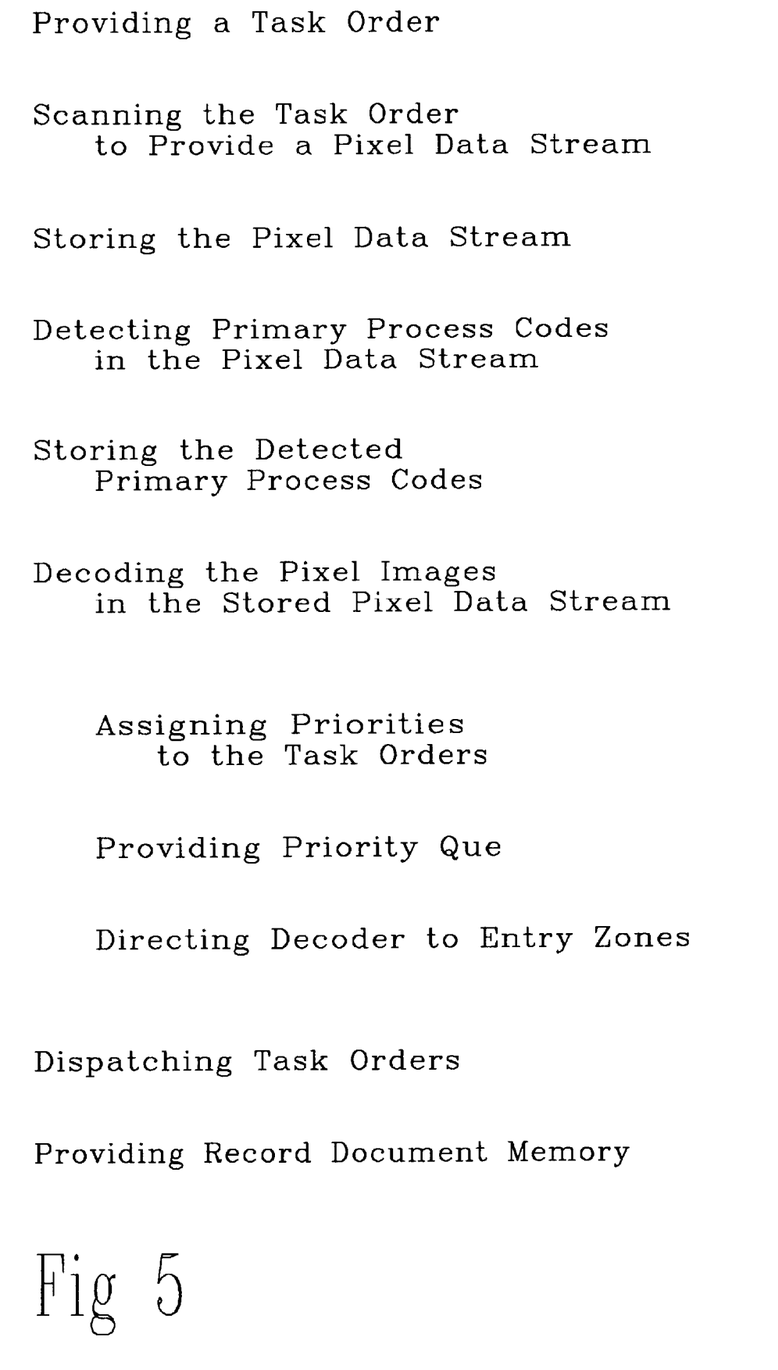
FIG. 5 is a flow chart showing the general hierarchical method of dispatching task orders.

HIERARCHICAL METHOD (FIG. 5)

The primary steps of the general hierarchical method of processing and dispatching the task orders throughout a user network, is shown in the flow chart of FIG. 5. The steps of the method are described below with reference to hierarchical task order systems shown in FIGS. 1, 3 and 4.

Providing a task order carried on an input medium suitable for scanning. The task orders have sequential processing conditions within the method which include, a pre-decoding primary condition, a decoding condition, and a post-decoding dispatch condition.

Each task order contains primary process codes associated with the record documents which facilitate the processing of the task orders during the pre-decoding primary condition. Each task order also contains up to N types of secondary dispatch images associated the record documents which facilitate the processing of the task orders during the post-decoding dispatch condition after the dispatch images have been decoded.

Scanning the task order carried on the input medium during the pre-decoding primary condition to provide a pixel data stream incorporating pixel images of the primary process codes and the N types of dispatch images contained in the task order.

Storing the pixel data stream from the scanner in a task order memory which stores pixel images waiting for decoding;

Detecting the primary process codes in the pixel data stream from the scanner during the pre-decoding primary condition, based on the pixel image of the process codes;

Storing the detected primary process codes in a process code memory which hold the detected process codes available during the processing of the task order;

Decoding the pixel images of the N types of dispatch images contained in the task order stored in the task order memory during the decoding condition to obtain dispatch image codes.

Dispatching the task order associated with the record documents in response to the codes for executing the various kinds of dispatch tasks. The task order scanning step and the process code detecting step may proceed simultaneously during the pre-decoding primary condition in order reduce the time required to obtain process codes for processing of the task order. The primary code detector may be any suitable computer program or hardware circuit which can rapidly determine if a sequence of bits is a bar code or digital code.

The general hierarchical method may have the following additional steps.

Directing the decoder during the decoding step to dispatch image entry zones containing dispatch images and located within the task order at predetermined positions designated by the primary process codes. These entry zones prevent the decoder from decoding images outside the dispatch image entry zones, thus minimizing the decoder requirements of the method.

Assigning priorities to the task orders waiting for decoding after the primary process code detecting step and before the task order decoding step. The priorities are based on priority codes involved in the process codes which designate the relative priority of each kind of dispatch task in the set of "T" dispatch tasks. These priorities facilitate the decoding of the dispatch images by directing the decoder to the highest priority task order.

Providing a priority que which tracks the task orders stored in the task order memory waiting for decoding. The priority que responds to the priority codes for presenting the task orders to the decoder in order of priority.

Providing a record document memory which stores pixel images of the user record documents associated with the task order. The record documents may be retrieved from the record document memory by the primary process codes during the processing of the task orders.

INDUSTRIAL APPLICABILITY

It will be apparent to those skilled in the art that the objects of this invention have been achieved as described hereinbefore by providing an improved apparatus and method for processing and dispatching record document task orders throughout a user network. The task orders contain primary process codes which initiate the processing of the task orders without the time delay inherent in classification and decoding. The primary process codes may be detected while the task orders are being scanned, thus avoiding a further delay. The secondary dispatch images are decoded with the assistance of processing information in the primary process codes. A plurality of decoders may be employed to decode a plurality of code formats, each one dedicated to a particular format. Primary process codes may designate the location of the secondary dispatch images within the task order and the priority of the task orders waiting to be decoded.

Clearly various changes may be made in the embodiments shown herein without departing from the concept of the invention. Further, features of the embodiments shown in the various figures may be employed with the embodiments of the other figures.

Therefore, the scope of the invention is to be determined by the terminology of the following claims and the legal equivalents thereof.

I claim as my invention:

1. A hierarchical system which processes and dispatchs task orders throughout a user network for executing various kinds of dispatch tasks which affect record documents, comprising:

task orders carried on an input medium suitable for scanning, and associated with the user record documents, and having sequential hierarchical processing conditions within the system including, a pre-decoding primary condition, a decoding condition, and a post-decoding dispatch condition;

each task order contains primary process codes which facilitate the processing of the task orders during the pre-decoding primary condition;

each task order also contains secondary dispatch images which facilitate the processing of the task orders during the post-decoding dispatch condition after the dispatch images on the task order have been decoded;

scanner which scans the task order carried on the input medium during the pre-decoding primary condition to provide a pixel data stream incorporating pixel images of the primary process codes and the dispatch images contained in the task order;

primary code detector which monitors the pixel data stream from the scanner during the pre-decoding primary condition, and which detects the primary process codes therein based on the pixel images;

primary code memory which stores the detected primary process codes and which holds the detected primary process codes available to the system during the processing of the task orders;

task order memory which receives the pixel data stream from the scanner, and which stores the pixel images of the dispatch images on the task orders during the decoding condition;

at least one decoder which decodes the pixel images of the dispatch images contained in each task order stored in the task order memory during the decoding condition to obtain dispatch image codes;

dispatcher responsive to either the primary process codes or the dispatch image codes or both for dispatching the task orders associated with the record documents during the post-decoding dispatch condition for executing the dispatch tasks.

2. The system of claim 1, further comprising secondary code memory which stores the dispatch image codes of the decoded dispatch images, and which holds the dispatch image codes available to the system during the dispatching of the task orders.

3. The system of claim 1, wherein:

the detected primary process codes from each task order contain at least one task ID code, defining a particular dispatch task of record document dispatch task; and the dispatcher is responsive to each task ID code for dispatching task orders in accordance with the particular dispatch task defined thereby.

4. The system of claim 3, wherein the task ID codes form a set of "T" codes, and the record document dispatch tasks defined by the task ID codes form a corresponding set of "T" dispatch tasks.

5. The system of claim 3, wherein the task ID codes are located within the task order at a predetermined task ID placement zones.

6. The system of claim 5, wherein the task ID codes further comprise:

composite task ID codes having a basic task ID code which is located within the task order at a predetermined basic placement zone, and at least one auxiliary task ID code which is located within the task order in an auxiliary placement zone at a predetermined position relative to the basic zone.

7. The system of claim 3, wherein the task ID codes are not located within the task order at predetermined task ID placement zones.

8. The system of claim 3, wherein the task ID codes from the task orders define process parameters for each kind of dispatch task, which process parameters facilitate processing the task orders during the processing conditions; and the dispatch image codes from each task order define dispatch parameters which facilitate dispatching the task orders during the post-decoding dispatch condition.

9. The system of claim 8, wherein the process parameters are primary process codes embedded in the code of the detected primary process codes.

10. The system of claim 8, further comprising:

a parameter memory which stores the process parameters as codes therein; and the process parameter codes defined by each task ID code are selected by that task ID code, and held available in the parameter memory during the processing conditions.

11. The system of claim 10, wherein at least some of dispatch images are located in dispatch image entry zones having predetermined positions within the task orders, and the process parameter codes for those dispatch images include zone codes which designate the locations of the predetermined positions, for facilitating the decoding of the dispatch image by directing the decoder to the dispatch image entry zones within the task order preventing the decoder from decoding images outside the dispatch image entry zones, thus minimizing the decoding requirements of the system.

12. The system of claim 11, wherein the dispatch images located in the entry zones are images of human readable symbols hand entered into the entry zones.

13. The system of claim 11, further comprising:

zone override which overrides the zone codes, permitting the decoder to decode images outside the dispatch image entry zones.

14. The system of claim 10, wherein the process parameter codes include priority codes which designate relative priority of each kind of dispatch task for assigning a priority to each task order waiting for decoding, for facilitating the decoding of the dispatch images by directing the decoder to a highest priority task order.

15. The system of claim 14, further comprising:

a decode Que which tracks the task orders stored in the task order memory waiting for decoding, and which responds to the priority codes for presenting the task orders to the decoder in order of priority.

16. The system of claim 14, further comprising:

priority override which overrides the priority codes, permitting the decoder to decode the task orders as directed by the priority override.

17. The system of claim 1, further comprising:

record document memory which stores pixel images of the user record documents associated with the task orders, and record document ID codes in the primary process codes of each task order for retrieving the record documents during the processing of the task orders.

18. The system of claim 1, wherein the dispatch images are located within the task order at dispatch image entry zones having predetermined positions, and the detected primary process codes from each task order involve zone codes which designate the locations of the predetermined position for facilitating the decoding of the dispatch images by directing a decoder to dispatch image entry zones within the task order preventing the decoder from decoding images outside the dispatch image entry zones, thus minimizing the decoding requirements of the system.

19. The system of claim 1, wherein the dispatch images have N types of code formats where N is an integer having a value of 1 or greater, and each task order contains up to N types of the code formats.

20. The system of claim 19, further comprising:

N secondary decoders each of which decodes one of the N types of dispatch image code formats.

21. The system of claim 19, wherein the primary process codes are digital codes, and at least one of the N types of dispatch images are classifiable symbols.

22. The system of claim 21, wherein the classifiable symbols are human readable.

23. The system of claim 22, wherein the digital process codes are bar codes, and N=1.

24. A method of processing task orders associated with user record documents and dispatching a task order throughout a user network, for executing dispatch tasks which affect the record documents, comprising the steps:

providing task orders carried on an input medium suitable for scanning, and having sequential processing conditions within the method which include, a pre-decoding primary condition, a decoding condition, and a post-decoding dispatch condition, each task order containing primary process codes which facilitate the processing of the task orders during the pre-decoding primary condition, each task order also containing secondary dispatch images which facilitate the processing of the task orders during the post-decoding dispatch condition after the dispatch images have been decoded;

scanning the task order carried on the input medium during the pre-decoding primary condition to provide a pixel data stream incorporating pixel images of the primary process codes and the dispatch images contained in the task order;

storing the pixel data stream from the scanner in a task order memory which stores pixel images waiting for decoding;

detecting the primary process codes in the pixel data stream from the scanner during the pre-decoding primary condition, based on the pixel image of the primary process codes;

storing the detected primary process codes in a process code memory which hold the detected primary process codes available during the processing of the task orders;

decoding the pixel images of the dispatch images contained in the task orders stored in the task order memory with a decoder during the decoding condition to obtain dispatch image codes; and dispatching the task orders associated with the record documents in response to the codes for executing the dispatch tasks.

25. The method of claim 24, wherein the task order scanning step and the primary process code detecting step proceed simultaneously during the pre-decoding primary condition in order to reduce a time required to obtain primary process codes for processing of the task orders.

26. The method of claim 24, comprising during the decoding step, the additional step of:

directing a decoder to dispatch image entry zones containing dispatch images and located within the task order at predetermined positions designated by the primary process codes, for preventing the decoder from decoding images outside the dispatch image entry zones, thus minimizing the decoder requirements of the method.

27. The method of claim 24, wherein after the primary process code detecting step and before the task order decoding step, the additional step of:

assigning priorities to the task orders waiting for decoding based on priority codes involved in the primary process codes which designate a relative priority of each kind of dispatch task in the set of "T" dispatch tasks for facilitating the decoding of the dispatch images by directing the decoder to a highest priority task order.

28. The method of claim 27, further comprising the additional step of:

providing a priority que which tracks the task orders stored in the task order memory waiting for decoding, and which responds to the priority codes for presenting the task orders to the decoder in order of priority.

29. The method of claim 24, further comprising the additional step of:

providing record document memory which stores pixel images of the user record documents associated with the task orders, which record documents may be retrieved by the primary process codes during the processing of the task orders.

* * * * *